Nov. 29, 1927.　　　　　　　　　　　　　　　　　　　1,651,067
O. J. NITARDY
WIND MOTOR
Filed Jan. 23, 1926　　　2 Sheets-Sheet 1
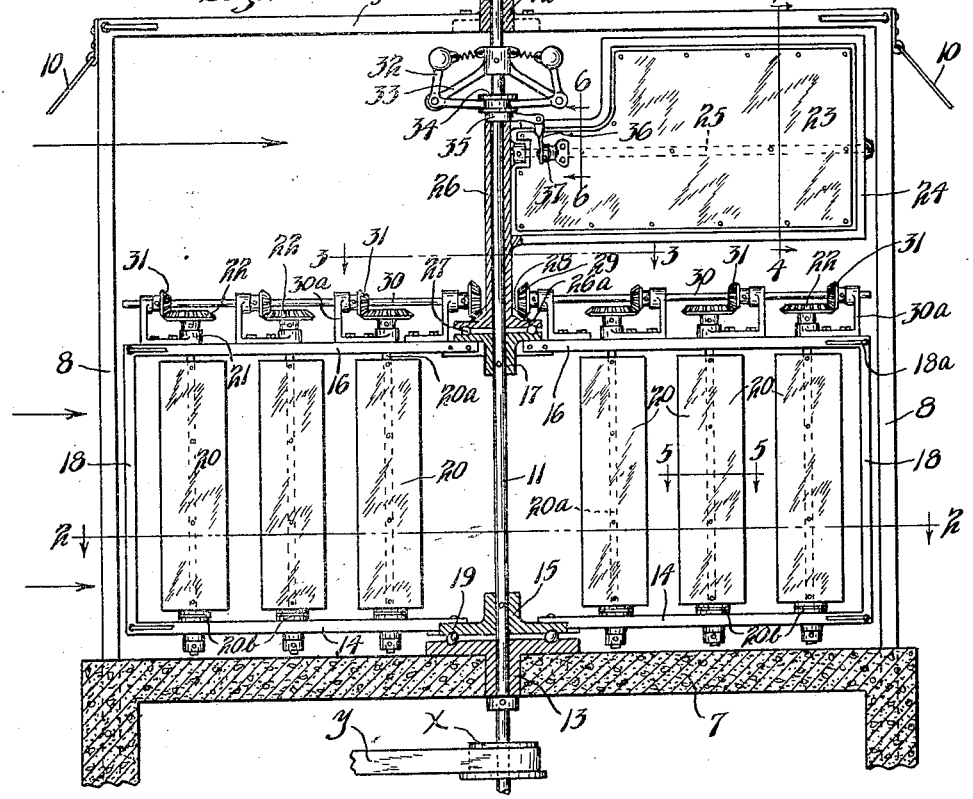
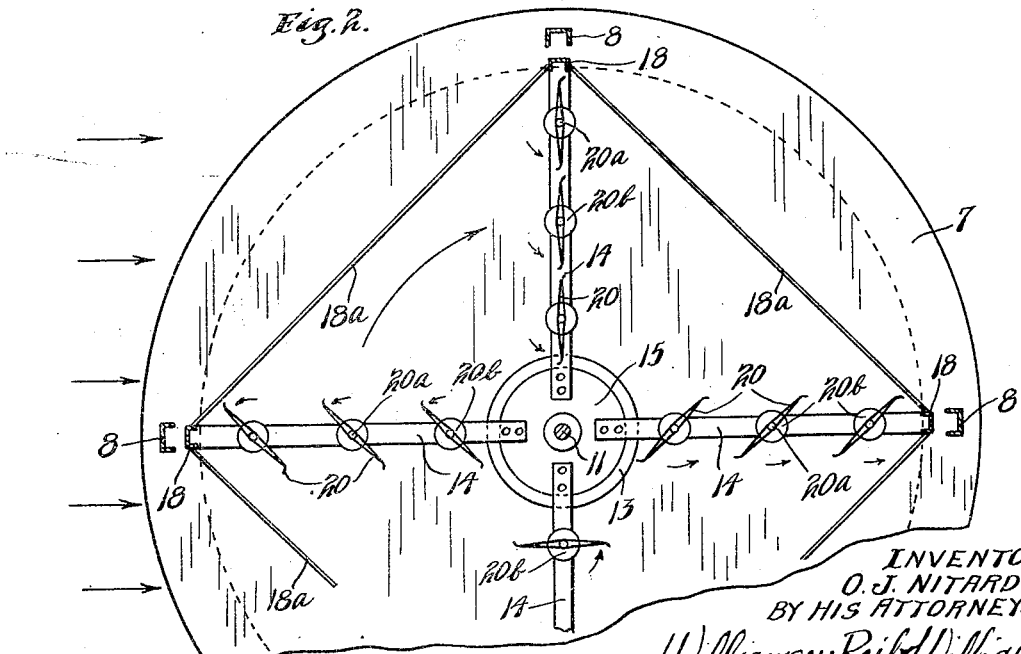
INVENTOR.
O. J. NITARDY
BY HIS ATTORNEYS.
Williamson Reif & Williamson Nov. 29, 1927.                                                    1,651,067
                          O. J. NITARDY
                           WIND MOTOR
                        Filed Jan. 23, 1926                    2 Sheets-Sheet 2
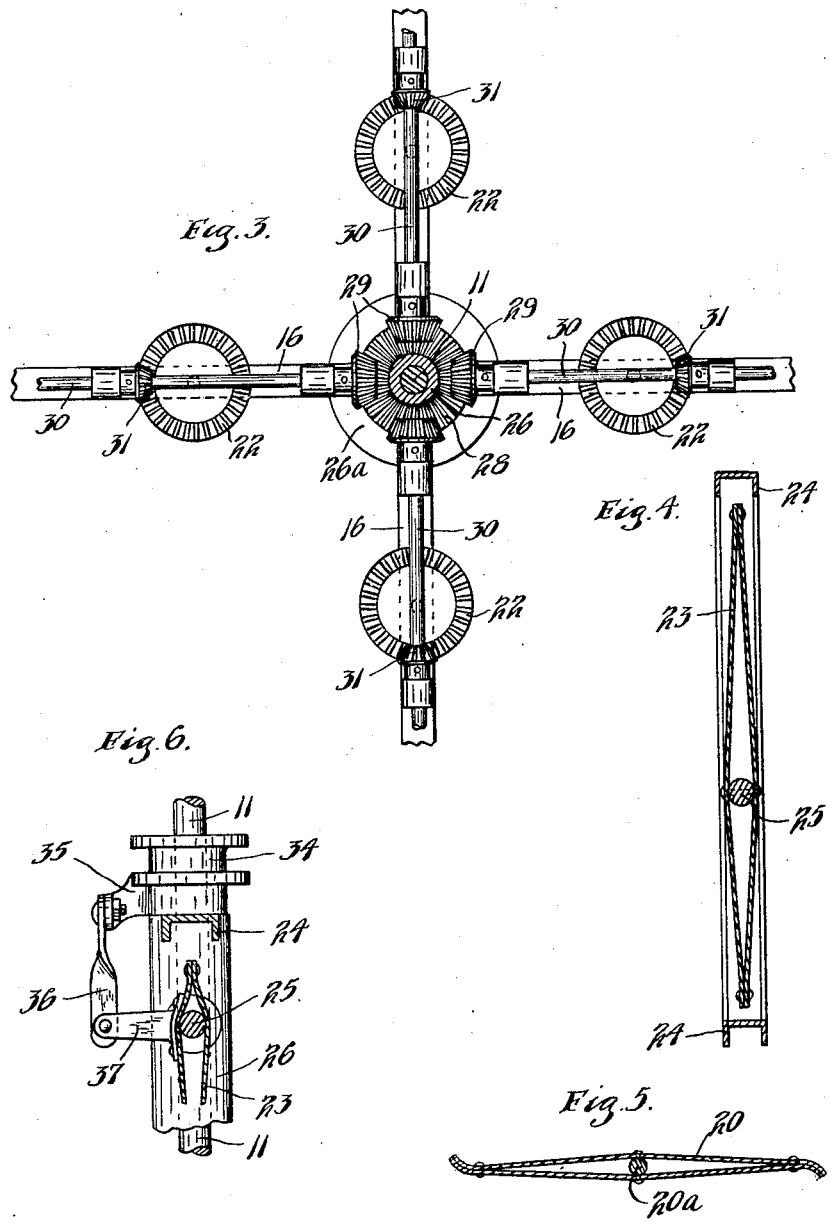
INVENTOR.
O.J. NITARDY.
BY HIS ATTORNEYS Patented Nov. 29, 1927.

1,651,067

UNITED STATES PATENT OFFICE.

OTTO J. NITARDY, OF MINNEAPOLIS, MINNESOTA.

WIND MOTOR.

Application filed January 23, 1926. Serial No. 83,302.

This invention relates to wind motors or wind mills adapted to generate a large amount of power.

It is the main object of the invention to provide a simple but highly efficient device by which wind power can be utilized to the best advantage.

It is a further object of the invention to provide a wind motor having a revoluble frame to which are revolubly mounted a plurality of circumferentially spaced wings operatively connected with mechanism for revolving the same as the frame revolves whereby said wings will always be held in the most advantageous position with respect to the direction of the wind.

Another object of the invention is to provide means in the form of a vane for automatically adjusting said wings and maintaining the same in proper position according to the direction of the wind.

It is another object of the invention to provide in such a wind motor, comprising a frame revoluble on a fixed axis and carrying a plurality of circumferentially spaced revoluble wings automatically adjusted and held into the wind by means of a vane swingable on the axis of said frame, efficient mechanism for revolving the several wings with the revolution of said frame so that each wing in its orbit described about the axis of the frame will be acted upon by the wind through approximately three-fourths of its orbit to assist in revolving said frame; in other words, in proper position to receive the wind so that the wind will have a pulling or pushing action thereon.

It is a still further object of the invention to provide in such a device a governor adapted to lessen the wind desistance of the vane whereby the efficiency of the device will be slightly lowered when the speed of the frame has reached a certain point.

It is a more specific object to provide in such a device a revoluble frame, several sets of circumferentially spaced wings arranged in different angular positions relative to each other at all times, and operating mechanism adapted to revolve each of said wings through one-half of a revolution as said frame revolves through a full revolution, said mechanism being operated by the revolution of said frame.

These and other objects of the invention will be apparent from the following description made in connection with the accompanying drawings, wherein like characters refer to similar parts throughout the several views, and in which Figure 1 is a vertical section of an embodiment of the invention, Figure 2 is a somewhat diagrammatical cross section on the line 2—2 of Figure 1, showing the different angular positions of the several wings throughout the quadrants of revolution of the frame, the directions of revolutions being indicated by means of arrows, Figure 3 is a cross section taken on the line 3—3 of Figure 1, showing the mechanism for revolving the several wings, Figure 4 is a vertical section taken on the line 4—4 of Figure 1, illustrating the construction of the vane, Figure 5 is a cross section on a larger scale taken on the line 5—5 of Figure 1, illustrating the construction of one of the wings, and Figure 6 is a vertical section taken on the line 6—6 of Figure 1, showing the construction of the governing mechanism.

In the drawings a suitable support in the form of a concrete base or housing is indicated by the numeral 7, having embedded adjacent the sides thereof, the upright supports 8 circumferentially arranged. In the drawings 4 uprights are shown supporting the radially extending beams 9 intersecting at a central point. Stays or other bracing members 10 are provided secured at their upper ends to uprights 8.

A revoluble frame is mounted on support 7, comprising a vertical shaft 11, journaled in vertical bearings 12 and 13, mounted on the intersecting portions of beams 9, and the center of support 7 respectively. A set of lower radially extending arms 14 are rigidly secured to the lower portions of shaft 13, being made rigid with the collar 15, which is keyed or otherwise secured to the lower end of shaft 11. An upper set of similarly formed radial arms 16, arranged parallel with said lower set of arms are rigidly secured to shaft 11 at some distance above arms 14 by means of the collar 17. Upright members 18 connect the outer ends of the corresponding upper and lower radial arms bracing the same and forming a strong frame capable of revolution about the axis of shaft 11. Horizontally extending tie rods 18ª connect the several upper and lower radial arms 16 and 14 respectively, strengthening the revoluble frame and serving to maintain the radial arms in proper position. A thrust bearing is formed between the under side of collar 15 and the upper horizontal surface of bearing 13, said parts having a circular race cut therein to accommodate ball bearings 19.

In the drawings the frame is shown as made up of four pairs of radially extending arms, although any desired number may be used, each of said pairs of arms having three revoluble wings journaled therebetween with their axes disposed parallel to the axis of shaft 13. It will be noticed (see Figure 2) that all of these wings form three separate sets of circumferentially spaced wind receiving members disposed about the axis of the revoluble frame. Each of wings 20 is secured to a vertical pivot member 20$^a$ the upper end of which is journaled in one of a plurality of bearings 21, projecting therethrough and having forty-five degree bevelled gears 22 rigidly secured to the upper extremity thereof. Suitable thrust bearings 20$^b$ are provided on arms 14 for the lower ends of pivot members 20$^a$.

The main shaft 11 of the frame is equipped at its lower end with a pulley X adapted to be connected by a belt Y or other device to a pump, generator or other mechanism to be driven.

A vane is provided comprising a relatively large substantially rectangular blade 23 pivotally mounted for vertical swinging movement within a similarly shaped frame 24. Blade 23 is formed by two sheets or plates secured together at their horizontal edges and also secured to a horizontally extending pivot member 25 (see Figure 4). The vertical sleeve 26 is rigidly secured to the inner side of frame 24, and is journaled on the upper portion of shaft 13. Sleeve 26 terminates at its lower end in an annular bearing surface 26$^a$, provided with a circular race which in cooperation with the upper surface of bearing 17, forms a thrust bearing containing ball bearings 27. The lower end of sleeve 26 is cast to form a 45 degree beveled gear 28 on the upper side of the thrust bearing 26$^a$. This bevelled gear engages a plurality of smaller forty-five degree bevelled gears 29 (four in number as illustrated), each rigidly secured to the inner end of a radially and horizontally extending shaft 30 journaled in brackets 30$^a$ mounted on the top of each of upper radial arms 16. Shafts 30 are thus mounted in alignment with the several pairs of radial arms and are each equipped with three horizontally spaced forty-five degree bevelled gears 31, each of said gears being meshed with one of the gears 22 at the upper ends of the wing pivots 20$^a$. The ratio of gears 28 and 29 is 2 to 1, respectively, while the ratio of gears 31 and 22 is 1 to 4 respectively. Thus it will be seen that since gear 28 is maintained practically stationary by means of the vane, the wings 20 will be revolved by the movement of the revoluble frame through one-half a revolution for every complete revolution of said frame and will be revolved in the opposite direction from the revolution of said frame. It will also be noticed that the relative positions of the several wings 20 will be automatically set or changed before the frame starts to revolve by the position of vane 23, the direction of the wind, of course, determining the position of said vane.

To prevent the frame from revolving at too fast a speed an efficient governor mechanism is provided. This consists of a pair of fly ball levers 32 pivoted to the outer ends of a yoke 33 rigidly secured adjacent the upper end of shaft 11. The inwardly extending working ends of fly ball levers 32 are seated in a vertically movable shipper ring 34, which limits the upward movement of a vertically slidable arm 35 provided with an annular portion slidable on shaft 11, and limited in downward movement by the upper end of sleeve 26. The outer end of arm 35 is pivotally secured to the swingable blade 23 of the vane by means of a depending link 36 having its lower end pivoted to outwardly projected lug 37 rigidly secured to an intermediate portion of the vane blade. It will thus be seen that as the revoluble frame increases in speed flyball levers 32 will be impelled outwardly by centrifugal force, causing the shipper ring 34 to be raised and thereby permitting the vane blade 23 to swing slightly open into the wind. The wind resistance of the vane will thus be lowered and the several wings 20 will not be held directly against the wind and will thereby cause the motor to slightly lessen its speed.

As illustrated in Figure 5, each of the wings 20 comprises a pair of substantially rectangular plates secured together adjacent their vertical sides, and having their central portions secured together through the vertical pivot members or shafts 20$^a$. It will be noticed that the vertical edges of the several wings 20 are curved or bent in reverse directions at each side thereof, thereby forming convex vertical portions on the outer edges of said wings, and concave vertical portions on the inner edge. By shaping the wings in this manner the pressure of the wind will assist the mechanism previously described in revolving the several wings in the proper direction as the frame revolves, and will substantially compensate for the friction in the several bevel gears.

Operation.

The operation of the above described device may be briefly summarized as follows:

As shown in Figure 2, three sets of circumferentially spaced revoluble wings 20 are provided. Each set is shown as comprising four wings arranged in different angular positions relative to each other and to the four radial arms on which the same are mounted. Where the wings are mounted on four radial arms each successive wing in a set is disposed relative to its adjacent wing at an angle of forty-five degrees. If six radial arms were employed the wings would be successively arranged in thirty degree relation, the object being to revolve the wings through a half-revolution every complete revolution of the revoluble frame.

Assuming that the wind is blowing from the left to the right as indicated in Figure 2 by the straight arrows, the wings on one of the arms disposed normal to the wind will also be disposed normal to the wind. These wings will be revolved in the reverse direction to the frame to a position parallel with the wind when the frame has been swung through one hundred and eighty degrees, so that as the several wings are swung into the wind they will have little or no resistance thereto. Similar to a sail boat tacking against the wind, the wings throughout approximately three-fourths of their orbit about the axis of the shaft 11 will be revolved and disposed in proper position to receive a maximum of benefit from the wind; thus in their intermediate positions between their position normal to the wind and their opposite position parallel to the wind the wind will have a pulling or pushing action upon the revoluble frame.

Obviously, since the bevelled gear 28 is rigidly secured to sleeve 26, the several wings will be automatically and uniformly adjusted according to the position of the vane so that the wind will be received most advantageously. As the wind changes the position of the vane will of course change and each of the several wings 20 will be automatically revolved to compensate for the change in the wind. Gear 28 will then be maintained in stationary position by the vane and the revolution of the frame about shaft 11 will cause the wings to revolve one-half as fast by means of the mechanism hitherto described.

The gear mechanism engaging the relatively stationary gear 26 positively turns the wings in proper receiving position so that there can be no efficiency lost due to loosely swinging wings away from the wind.

The operation and function of the governing device has been clearly described, and prevents the motor from exceeding a certain predetermined speed.

It is of course within the contemplation of the inventor that various means may be employed in the vane blade for changing the wind resistance of the same with the speed of the motor, for instance, slidable shutters could be operatively connected to the governing mechanism for accomplishing the same results.

It will be apparent from the foregoing description that the applicant has invented a simple, but highly efficient wind motor capable of being manufactured at comparatively little cost, which will utilize the wind with an extremely high degree of efficiency. The motor is applicable to large plants for irrigating purposes, or for generating and storing up electrical current.

It will, of course, be understood that various changes may be made in the form, details, proportion and arrangement of parts without departing from the scope of the invention. Likewise it will of course be understood that a plurality of vertically aligned frames may be rigidly secured to shaft 11 or that sets of wings may be mounted on additional arms in vertical alignment with the wings thereabove, all within the scope of the invention.

What is claimed is:

1. In a wind motor, a revoluble frame, a plurality of circumferentially disposed wings mounted for independent rotation on said frame with their axes substantially parallel with the axis of said frame, means for feathering said wings, including a master gear co-axial with said frame, a vane rigidly connected to said master gear having a variable wind resistance, a governor rigidly connected with said frame, and means connecting said governor with said vane, whereby the wind resistance thereof may be varied relatively to the speed of said frame.

2. In a wind motor, a revoluble frame, a plurality of circumferentially disposed wings mounted for independent rotation on said frame with their axes substantially parallel with the axis of said frame, means dependent upon the revolution of said frame for causing said wings to be rotated through one half a rotation for every revolution of said frame, a vane connected to said means having a variable wind resistance, fly ball levers connected with said frame, and means connecting said levers with said variable wind resistance, whereby the position of said vane will be varied relatively to the velocity of the wind and speed of said motor.

3. In a wind motor, a revoluble frame, a plurality of circumferentially disposed wings mounted for independent rotation on said frame with their axes substantially parallel with the axis of said frame, means for feathering said wings, including a master gear co-axial with said frame adapted to cause said wings to rotate through one-half a rotation for each revolution of said frame, a vane rigidly connected to said master gear having an oscillatory wind resisting surface pivoted on an axis extending laterally to the axis of said vane, a governor connected with said frame and means connecting said governor with said wind resisting surface, whereby the position of said surface will be varied relatively to the speed of said frame.

4. A wind motor comprising a revoluble frame, a plurality of circumferentially disposed wings mounted for independent rotation on said frame with their axes substantially parallel with the axis of said frame, means for feathering said wings, including a master gear co-axial with said frame adapted to rotate said wings through one half a rotation for every revolution of said frame, a co-axial driving shaft rigidly connected with said frame, a vane mounted to oscillate on a portion of said driving shaft, said vane being rigidly connected with said master gear, said vane having a wind resisting plate swingable on an axis radially disposed to said driving shaft, a governor connected to said driving shaft, and means eccentrically connected to said plate for tilting the same to vary the wind resistance according to the speed of said shaft.

5. A wind motor comprising a revoluble frame, a wing mounted for independent rotation on said frame, having its axis disposed parallel to the axis of said frame, means for causing said wing to rotate through one-half a rotation for every revolution of said frame to expose said wing to the wind at the angle of greatest efficiency throughout the travel of said frame, said wing having reversely curved longitudinal edges, whereby the action of the wind will assist in rotating said wing.

6. A wind motor comprising a revoluble frame, a set of circumferentially spaced wings mounted for independent rotation on said frame with their axes substantially parallel with the axis of said frame, said wings being successively set at the same angle relatively to each other, means for feathering said wings, whereby each wing will be rotated through one-half a rotation for every revolution of said frame, said wings having reversely turned longitudinal edges, whereby the action of the wind will assist the feathering thereof.

In testimony whereof I affix my signature.

OTTO J. NITARDY.